(12) United States Patent
Yang et al.

(10) Patent No.: US 8,330,746 B2
(45) Date of Patent: Dec. 11, 2012

(54) ADDRESSING METHOD AND STRUCTURE FOR MULTIPLE CHIPS AND DISPLAY SYSTEM THEREOF

(75) Inventors: Jen-Ta Yang, Hsinchu County (TW); Yung-Lung Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 568 days.

(21) Appl. No.: 12/560,433

(22) Filed: Sep. 16, 2009

(65) Prior Publication Data

US 2011/0018888 A1    Jan. 27, 2011

(30) Foreign Application Priority Data

Jul. 21, 2009   (TW) ................................ 98124598 A

(51) Int. Cl.
*G09G 5/00* (2006.01)
(52) U.S. Cl. ........................ 345/204; 345/564; 713/600
(58) Field of Classification Search ........................ None
See application file for complete search history.

(56) References Cited

U.S. PATENT DOCUMENTS

2008/0309597 A1*  12/2008  Nam et al. ...................... 345/87

FOREIGN PATENT DOCUMENTS

CN         1682264        10/2005

* cited by examiner

*Primary Examiner* — Jason Olson
(74) *Attorney, Agent, or Firm* — Jianq Chyun IP Office

(57) ABSTRACT

Addressing method for multiple chips is provided. Each chip includes an input enable terminal, an output enable terminal, a data input terminal, and a clock terminal. The output enable terminal of a previous stage is connected to the input enable terminal of a next stage. The method includes setting an initial address to an address of each chip via a system; setting a state of each chip to a disable state; enabling the state of a first-one chip among the chips to an enable state, and setting the first chip as a previous-stage chip; updating the address of the previous-stage chip; enabling a next-stage chip connected after the previous-stage chip, in which the system controls the output enable terminal of the previous-stage chip to output an enable signal to enable the next-stage chip, according to the address of the previous-stage chip; and the updating the address of the next-stage chip.

12 Claims, 4 Drawing Sheets

| block | 1 | 2 | 3 | 4 | 5 | ··· | K |
|---|---|---|---|---|---|---|---|
| 0 address | 0 | 0 | 0 | 0 | 0 | ···· | 0 |
| 0 state | disable | disable | disable | disable | disable | ··· | disable |
| 1 address | 0 | 0 | 0 | 0 | 0 | ···· | 0 |
| 1 state | disable | disable | disable | disable | disable | ··· | disable |
| 2 address | 0->1 | 0 | 0 | 0 | 0 | ···· | 0 |
| 2 state | enable | disable | disable | disable | disable | ··· | disable |
| 3 address | 1 | 0->2 | 0 | 0 | 0 | ···· | 0 |
| 3 state | enable | enable | disable | disable | disable | ··· | disable |
| 4 address | 1 | 2 | 0->3 | 0 | 0 | ···· | 0 |
| 4 state | enable | enable | enable | disable | disable | ··· | disable |
| 5 address | 1 | 2 | 3 | 0->4 | 0 | ···· | 0 |
| 5 state | enable | enable | enable | enable | disable | ··· | disable |
| 6 address | 1 | 2 | 3 | 4 | 0->5 | ···· | 0 |
| 6 state | enable | enable | enable | enable | enable | ··· | disable |
| K+1 address | 1 | 2 | 3 | 4 | 5 | ···· | 0->K |
| K+1 state | enable | enable | enable | enable | enable | ··· | enable |

ADDRESSING METHOD AND STRUCTURE FOR MULTIPLE CHIPS AND DISPLAY SYSTEM THEREOF

CROSS-REFERENCE TO RELATED APPLICATION

This application claims the priority benefit of Taiwan application serial no. 98124598, filed on Jul. 21, 2009. The entirety of the above-mentioned patent application is hereby incorporated by reference herein and made a part of specification.

BACKGROUND OF THE INVENTION

1. Field of the Invention

The invention generally relates to an image display technique. More particularly, the invention relates to an addressing technique for setting the addresses of a plurality of driving chips in an image display system.

2. Description of Related Art

As development of image displays trend towards larger device dimensions, a display such as a large television panel usually form images from a plurality of blocks. In order to provide local dimming for the blocks, an entire display panel is divided into multiple blocks, for example 16×8 blocks. An external control unit can independently control the brightness of the blocks. FIG. 1 is a schematic diagram illustrating a display system driven by dividing the display system into a plurality of blocks. Referring to FIG. 1, a display panel 100 of the display system can be divided into nine blocks 102 numbered 1-9, in which a system unit 108 controls nine driving chips 104 in a driving unit 106 corresponding to each of the blocks 102 for respectively controlling the brightness of the display panel 100, for example.

The system unit 108 usually transmits commands to the driving unit 106 through a serial interface. According to the commands received, the driving unit 106 adjusts a local brightness of the blocks in order to satisfy the requirements for a high performance of image display such as high contrast ratio and high gray level. According to an address transmitted by the external system unit 108, the driving chip 104 disposed in each of the blocks determine whether or not to allow reception of data corresponding to the driving chip 104, and thereafter enable a mechanism for brightness adjustment. In other design mechanisms, the driving chip 104 can determine whether or not to receive data based on the validity of the time slot corresponding to the driving chip.

Consequently, each driving chip needs to be set with an address by hardware. In one conventional technique, pin settings of the driving chip are externally determined. With different sets of blocks such as 16×8, 7 extra corresponding pins are needed. FIG. 2 is a schematic diagram illustrating a circuit structure using a conventional pin setting mechanism. Referring to FIG. 2, each of the driving chips 104 is respectively connected with the system 108 and respectively set with pin addresses Addr_0-Addr_n, so that all driving chips 104 have their corresponding addresses.

In another conventional technique where external pin settings are also utilized, an internal ADC is used to detect an external input voltage for determining the addresses of the driving chips. However, in practical applications the decision making can be easily affected by signal interference. Moreover, combination of the two aforementioned techniques can increase complexity in hardware design. Another conventional technique involves address setting the driving chips before dispatch from the factories, although this can increase the complexity of inventory management.

Another conventional technique involves the aforementioned time slot method, in which data is allowed to be received when the corresponding time slot for the driving chip is matched. FIG. 3 is a schematic diagram illustrating a circuit design in accordance with a conventional time slot receiving mechanism. Referring to FIG. 3, a data output terminal DATO of a previous-stage driving chip 110 is connected by a path 112 to an input terminal DATI of a next-stage driving chip 110, so that data is transmitted to all of the driving chips 110 in sequence. In this technique, not only is a clock terminal Clk needed for inputting a clock, if a particular data needs to be modified, for example within a block, then data in all of the blocks needs to be retransmitted. Since transmission failures in any path also result in retransmissions, there are significant time costs involved with this technique.

Therefore, the conventional chip addressing method and structure can be further developed.

SUMMARY OF THE INVENTION

Embodiments of the invention provide a method and a structure for addressing a plurality of chips and a display system thereof, in which the chip addresses can be set by a programmable mechanism any time.

The invention provides an addressing method for a plurality of chips. Each of the chips respectively includes an input enable terminal, an output enable terminal, a data input terminal, and a clock terminal, in which the output enable terminal of a previous stage is connected to the input enable terminal of a next stage, and the addressing method includes setting an initial address as an address of each of the chips via a system; setting a state of each of the chips to a disable state; setting the state of a first chip among the chips to the enable state via the system, and setting the first chip as a previous-stage chip; updating the address of the previous-stage chip; enabling a next-stage chip connected after the previous-stage chip; and updating the address of the next-stage chip.

The invention provides a structure for addressing a plurality chips, the structure including a plurality of chips. Each of the chips includes an input enable terminal, an output enable terminal, a data input terminal, and a clock terminal, in which the output enable terminal of a previous-stage chip is connected to the input enable terminal of a next-stage chip. The input enable terminal of a first chip among the chips is controlled a system terminal. The system terminal is connected to the data input terminal and the clock terminal of the chips, for respectively inputting a data signal and a clock signal to the chips synchronously, and the chips are adapted to receive the system for setting the addresses of the chips in sequence.

The invention provides a display system, including a display panel including a plurality of display blocks; a system unit; and a driving unit including a plurality of chips controlled by the system unit for driving the display blocks correspondingly. Each of the chips includes an input enable terminal, an output enable terminal, a data input terminal, and a clock terminal. The output enable terminal of the previous-stage chip is connected to the input enable terminal of a next-stage chip. The input enable terminal of a first chip among the chips is connected to the system unit, in which the system unit is connected to the data input terminal and the clock terminal of the chips and adapted for respectively inputting a data signal and a clock signal to the chips synchronously, and the chips are adapted for receiving an address setting from the system unit in sequence. The address setting from the system unit includes setting an initial address to an address of each of the chips via the system unit; setting a state of each of the chips to a disable state; setting the state of a first chip among the chips to the enable state, and setting the first chip as a previous-stage chip; updating the address of the previous-stage chip; enabling a next-stage chip connected after the previous-stage chip, in which according to the address of the previous-stage chip, the system controls the output enable terminal of the previous-stage chip to transmit an enable signal to enable the next-stage chip; updating the address of the next-stage chip; setting the next-stage chip as the previous-stage chip and repeating the above-described last three processes until all the chips have completed setup.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic diagram illustrating a plurality of address states in accordance with one embodiment of the invention.

DESCRIPTION OF EMBODIMENTS

Embodiments of the invention provide a method and a structure for addressing multiple chips using a programmable mechanism. No extra pins or resistance is required on the chips for address setting, and a corresponding synchronous time slot is not required for data receiving. Different addresses for each of the driving chips can be set by using an originally available serial interface, so that a need for local dimming is satisfied. Embodiments of the invention can be used for addressing multiple serially-connected chips.

Figure 3:
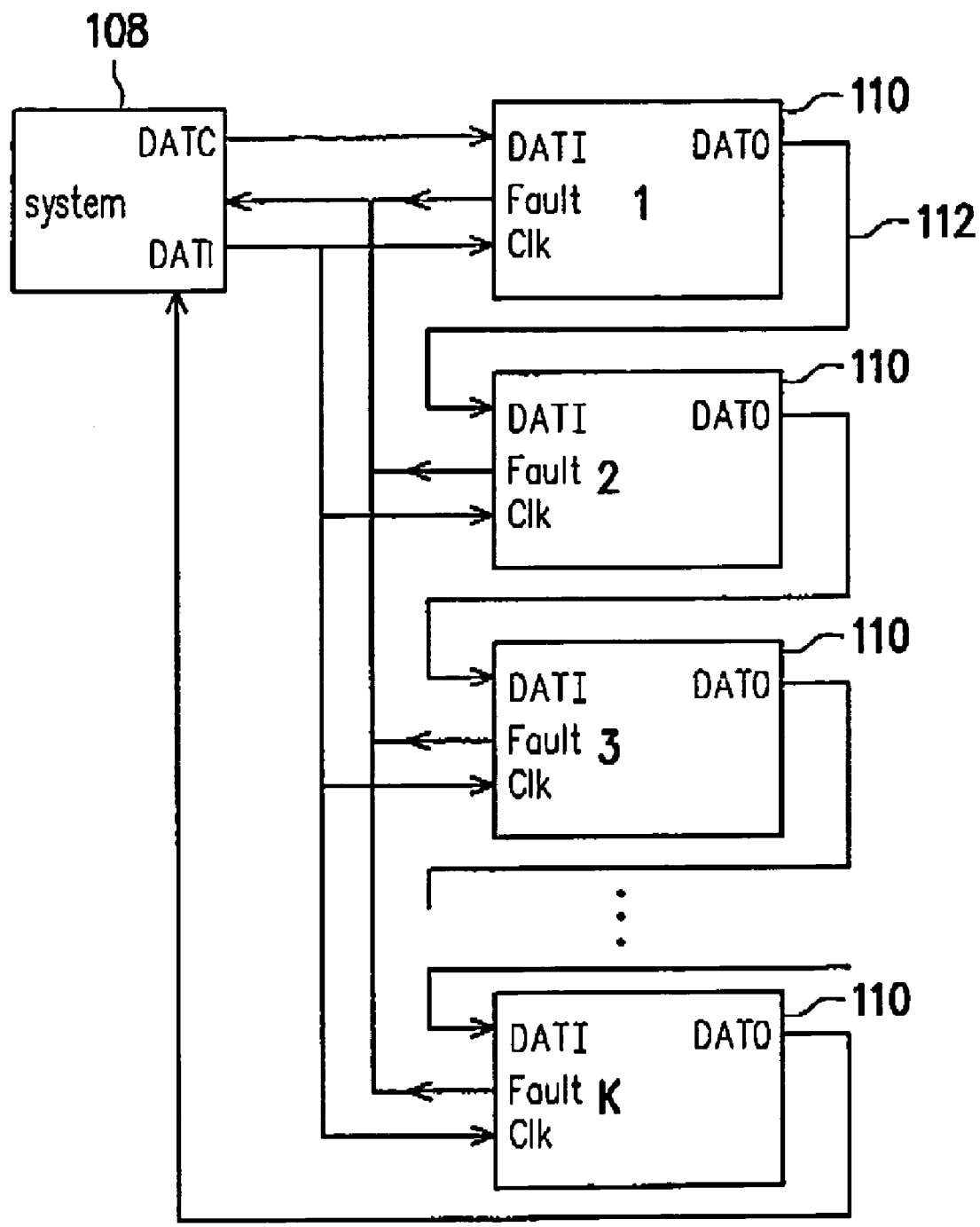
FIG. 3 is a schematic diagram illustrating a circuit design in accordance with a conventional time slot receiving mechanism.

Embodiments of the invention have a module design, hence no prior hardware setting is required. The module design is beneficial towards inventory management of the chips. The chips can be LED drivers. Furthermore, as shown in FIG. 3, since data can be directly transmitted on the serial interface, data does not need to be transmitted through extra blocks. In embodiments of the invention, if failure occurs during the transmission process, only a single block of data needs retransmission. Moreover, if only one of the blocks needs its brightness updated, only that block of data needs retransmission.

The following will describe some embodiments as examples of the invention, however the invention is not limited by the embodiments and the combinations thereof.

Figure 4:
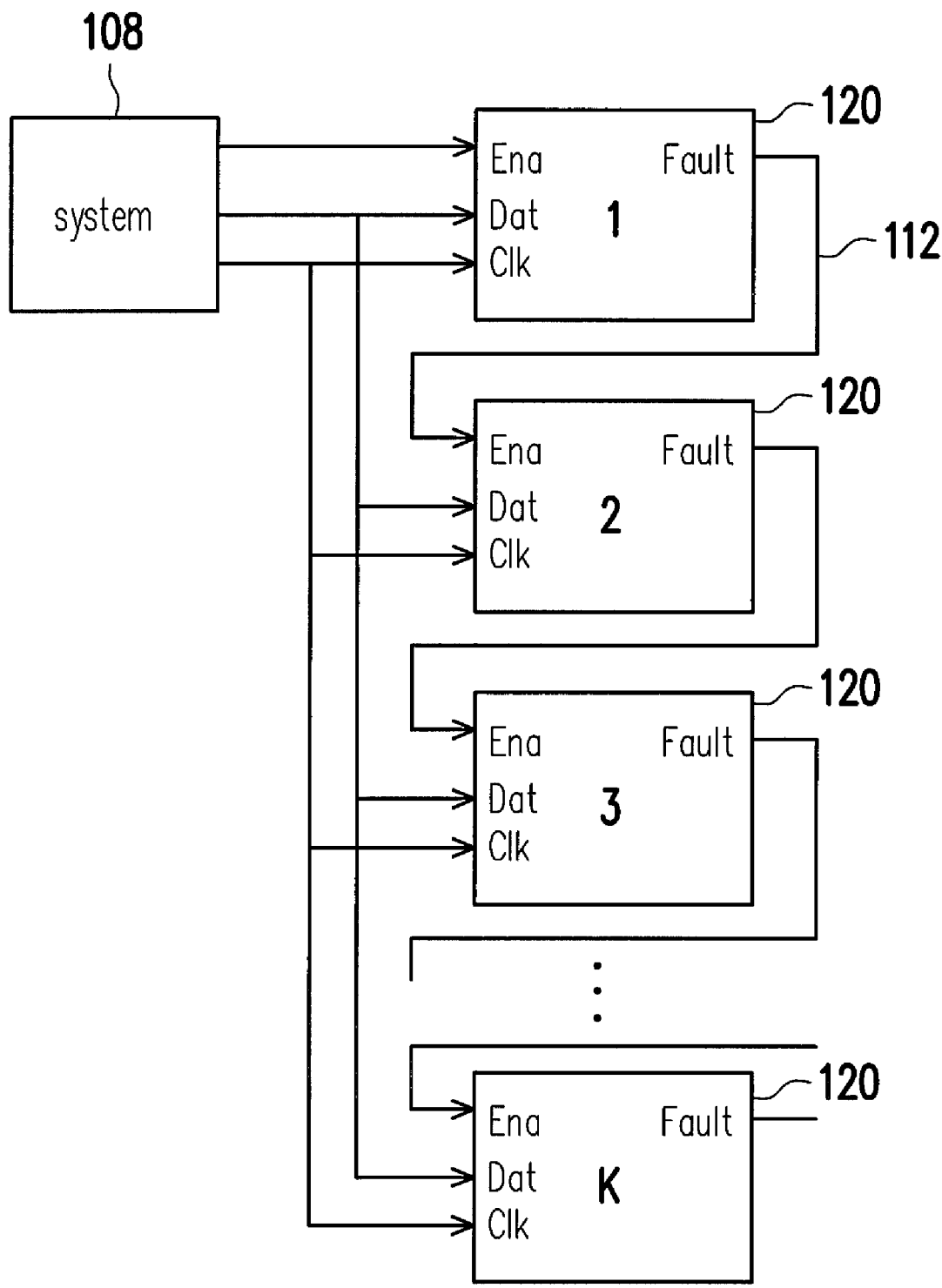
FIG. 4 is a schematic diagram illustrating the circuit structure for addressing a plurality of chips in accordance with one embodiment of the invention.

FIG. 4 is a schematic diagram illustrating the circuit structure for addressing a plurality of chips in accordance with one embodiment of the invention. Referring to FIG. 4, a plurality of chips 120, for example 1-K chips, are controlled by a system unit 108 for respectively driving a plurality of blocks on a display panel. Each of the chips 120 includes an input enable terminal Ena, an output enable terminal Fault, a data input terminal Dat, and a clock terminal Clk. The output enable terminal Fault of a previous-stage chip 120 is connected to the input enable terminal Ena of a next-stage chip 120.

The system unit 108 controls and directly connects to the input enable terminal Ena of a first chip 1 of the chips 120. The system unit 108 can also be referenced as a system 108. The chips 2-K following chip 1 are as described previously. A previous-stage chip 120 such as the chip 1 has the output enable terminal Fault connected to the input enable terminal Ena of the next-stage chip 2. The system unit 108 is connected to the data input terminal Dat and the clock terminal of each of the chips 120, for respectively and simultaneously inputting a data signal and a clock signal to the chips 120. The system unit 108 sets the address of the chips 120 in sequence.

In combination with the circuit structure of FIG. 4, without drastic hardware design changes for the chips, embodiments of the invention can set the address of the chips by using software execution. FIG. 5 is a schematic diagram illustrating a plurality of address states in accordance with one embodiment of the invention. Referring to FIG. 5, the operation of the entire system can be divided into a plurality of processes. The following takes a K block as example corresponding to K chips.

At an initial stage, the addresses of all the blocks are set to 0. For example, the system unit 108 resets the chips 120 so that all the chip addresses have an initial value such as 0.

Additionally, the output enable terminal Fault of all of the chips 1-K are set to a disable state, for example Fault=0. Therefore, all the chips 1-K cannot receive, since the input enable terminal Ena of the chips 1-K receives a data of 0 or Fault=0.

Thereafter in a stage 2, the input enable terminal of the chip 1 is enabled, and the system updates the address of chip 1, for example from a 0 initially to 1. At this time, the chips 2-K are still in the disable state.

Thereafter, in a stage 3, since the address setting of chip 1 is complete, the system can control the output enable terminal Fault of chip 1 to transmit an enable signal, for example Fault=1. In this manner chip 2 is enabled. In a similar manner, the system modifies the address of chip 2 to 2. At this time, the chips 3-K are still in the disable state.

Similarly, in stages 4-6 the addresses of chips 3-5 are set to 3-5 in sequence. In this manner, other chips can continue to be set, until all the chips are set and changed to the enable state.

Figure 1:
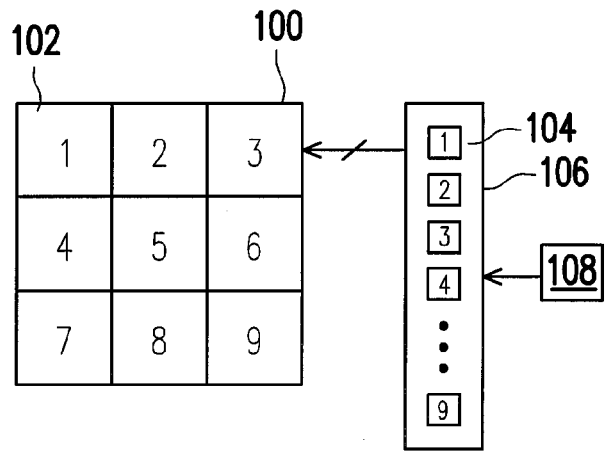
FIG. 1 is a schematic diagram illustrating a display system driven by dividing the display system into a plurality of blocks.
Figure 2:
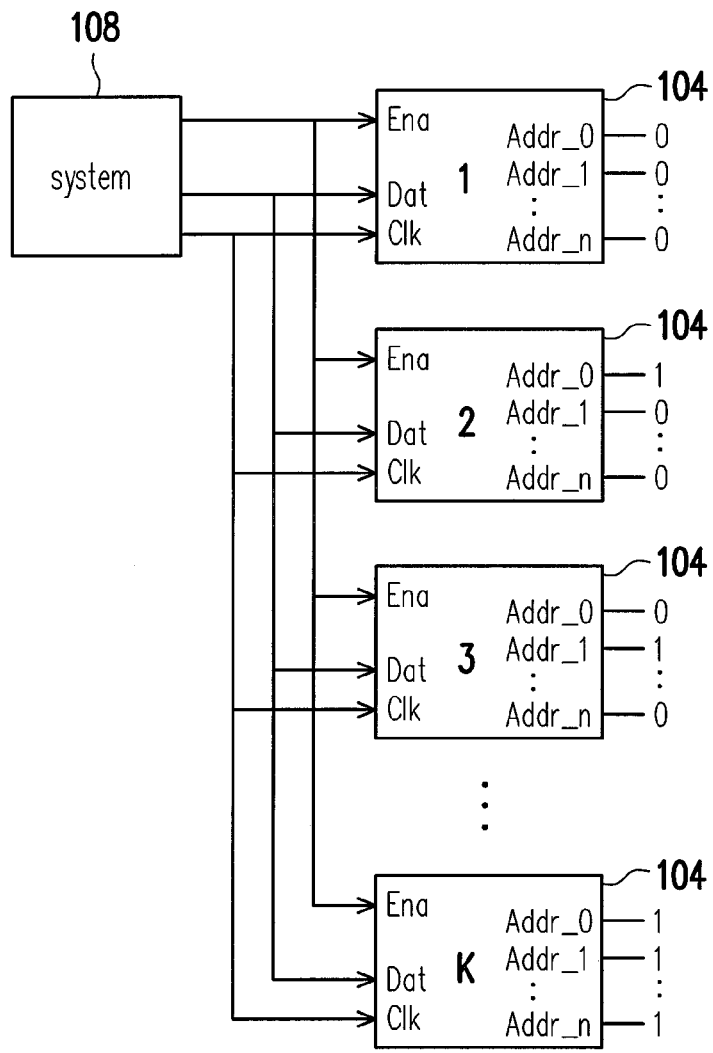
FIG. 2 is a schematic diagram illustrating a circuit structure using a conventional pin setting mechanism.

Thereafter, the chips can be used as depicted in FIG. 1, for example. The system only needs to adjust the local dimming according to the image data. Commands can be transmitted through the serial interface or other types of interfaces to each of light-emitting blocks. The driving chip at each of the light-emitting blocks receives data according to the address thereof, and thereafter performs dimming process. The system only needs to adjust the light-emitting blocks of the backlight that require adjustment.

The method and structure described by embodiments of the invention can decrease the number of connections necessary for controlling the local brightness of the display panel. An LED control device only needs to control the pin of the input enable terminal Ena of the chips in the block, while other LED blocks can use the serial configuration of the LED driving chip to connect to each other, thereby establishing control. Additionally, the LED driving chips are in the same form, unlike conventional one of which needs different models or designs of chips in accordance with different number of blocks.

Moreover, a system side in the invention can be standardized more easily. Conventionally, different numbers of blocks require different designs, or due to different addressing methods, different designs are needed. The structure described by embodiments of the invention preserve more flexibility. Expanding on the system side only requires transmitting different addresses to set the addresses of different numbers of LED driving chips.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An addressing method for a plurality of chips, wherein each of the chips respectively comprises an input enable terminal, an output enable terminal, a data input terminal, and a clock terminal, and the output enable terminal of a previous stage is connected to the input enable terminal of a next stage, the addressing method comprising:
   setting an initial address to an address of each of the chips via a system;
   setting a state of each of the chips to a disable state;
   setting the state of a first-one chip among the chips to an enable state via the system, and setting the first-one chip as a previous-stage chip;
   updating the address of the previous-stage chip;
   enabling a next-stage chip connected after the previous-stage chip; and
   updating the address of the next-stage chip.

2. The addressing method as claimed in claim 1, wherein if a number of chips surpasses two, then the next-stage chip is set as the previous-stage chip, and the last three step are repeated until all of the chips are set by:
   updating the address of the previous-stage chip;
   enabling a next-stage chip connected after the previous-stage chip; and
   updating the address of the next-stage chip.

3. The addressing method as claimed in claim 1, wherein after updating the addresses of the chips, the addresses are different from a plurality of sequential addresses among the initial addresses.

4. The addressing method as claimed in claim 3, wherein the initial address is 0.

5. The addressing method as claimed in claim 1, wherein the addresses are the sequential addresses 1, 2, . . . , K, wherein K is a positive integer.

6. The addressing method as claimed in claim 1, wherein the system inputs the address to the corresponding chip via the data input terminal.

7. A structure for addressing a plurality of chips, comprising:
   a plurality of chips, each of the chips comprising:
      an input enable terminal;
      an output enable terminal;
      a data input terminal; and
      a clock terminal, wherein the output enable terminal of the previous-stage chip is connected to the input enable terminal of the next-stage chip,
   wherein a system side controls the input enable terminal of a first-one chip among the chips,
   wherein the system side is connected to the data input terminal and the clock terminal of the chips, for respectively inputting a data signal and a clock signal to the chips synchronously, and the chips are adapted to receive the system for setting the addresses of the chips in sequence,
   wherein the system controls the output enable terminal of the previous-stage chip having completed address setting to transmit an enable signal for enabling the next-stage chip to receive an address setting.

8. A display system, comprising:
   a display panel unit comprising a plurality of display blocks;
   a system unit; and
   a driving unit comprising a plurality of chips, the driving unit controlled by the system unit for driving the display blocks correspondingly, each of the chips comprising:
      an input enable terminal;
      an output enable terminal;
      a data input terminal; and
      a clock terminal, wherein the output enable terminal of the previous-stage chip is connected to the input enable terminal of the next-stage chip, the input enable terminal of a first-one chip among the chips is connected to the system unit, the system unit is connected to the data input terminal and the clock terminal of the chips and adapted for respectively inputting a data signal and a clock signal to the chips synchronously, and the chips are adapted for receiving an address setting from the system unit in sequence,
   wherein the address performs the address setting comprising:
      setting an initial address to an address of each of the chips via the system unit;
      setting a state of each of the chips to a disable state;
      setting the state of a first-one chip among the chips to the enable state, and setting the first-one chip as a previous-stage chip;
      updating the address of the previous-stage chip;
      enabling a next-stage chip connected after the previous-stage chip, wherein according to the address of the previous-stage chip, the system controls the output enable terminal of the previous-stage chip to transmit an enable signal for enabling the next-stage chip;
      updating the address of the next-stage chip; and
      setting the next-stage chip as the previous-stage chip and repeating the above-described last three processes until all the chips have completed setup.

9. The display system as claimed in claim 8, wherein the addresses of the chips after updating are different from a plurality of sequential addresses among the initial addresses.

10. The display system as claimed in claim 8, wherein the initial address is 0.

11. The display system as claimed in claim 8, wherein the addresses are sequential addresses 1, 2, . . . , K, wherein K is a positive integer.

12. The display system as claimed in claim 8, wherein the system unit inputs the address to the corresponding chip via the data input terminal.

* * * * *